US012781075B2

(12) United States Patent
Iguchi et al.

(10) Patent No.: US 12,781,075 B2
(45) Date of Patent: Nov. 3, 2026

(54) WATER-BASED INK FOR INKJET RECORDING, PRINTED RECORDING MEDIUM, INKJET RECORDING METHOD, INKJET RECORDING DEVICE, AND INK STORAGE CONTAINER

(71) Applicant: BROTHER KOGYO KABUSHIKI KAISHA, Nagoya (JP)

(72) Inventors: Makito Iguchi, Nagoya (JP); Nao Mizuno, Nagoya (JP); Masato Isogai, Obu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 598 days.

(21) Appl. No.: 18/059,456

(22) Filed: Nov. 29, 2022

(65) Prior Publication Data

US 2023/0167322 A1 Jun. 1, 2023

(30) Foreign Application Priority Data

Dec. 1, 2021 (JP) ................................ 2021-195237

(51) Int. Cl.
*C09D 11/38* (2014.01)
*B41J 2/175* (2006.01)
(Continued)

(52) U.S. Cl.
CPC ........... *C09D 11/38* (2013.01); *B41J 2/17503* (2013.01); *B41M 5/50* (2013.01); *C09D 11/033* (2013.01);
(Continued)

(58) Field of Classification Search
CPC ..... C09D 11/38; C09D 11/033; C09D 11/037; C09D 11/102; C09D 11/322; B41J 2/17503; B41M 5/50
See application file for complete search history.

(56) References Cited

U.S. PATENT DOCUMENTS 5,609,671 A 3/1997 Nagasawa
2008/0241398 A1 10/2008 Kato et al.
(Continued)

FOREIGN PATENT DOCUMENTS

JP H08-3498 A 1/1996
JP 2000513396 A 10/2000
(Continued)

OTHER PUBLICATIONS

Extended European Search Report issued Apr. 28, 2023 in Patent Application No. 22208190.3, 6 pages.

*Primary Examiner* — Robert S Walters, Jr.
(74) *Attorney, Agent, or Firm* — Element IP, PLC

(57) ABSTRACT

A water-based ink includes a pigment, water, a penetrating agent, and a binder resin. The penetrating agent includes a compound of formula (1). x is greater than or equal to 6. The binder resin includes a urethane bond. A content of the binder resin in the water-based ink is greater than 1.0 mass %. The compound of formula (1) is preferably diethylene glycol monohexyl ether. The water-based ink preferably further includes an organic solvent having a solubility parameter (SP) value of 12 to 14.

$$C_xH_{2x+1}—O—(CH_2CH_2O)_2—H \quad (1)$$

15 Claims, 2 Drawing Sheets

(51) Int. Cl.

| | |
|---|---|
| ***B41M 5/50*** | (2006.01) |
| ***C09D 11/033*** | (2014.01) |
| ***C09D 11/037*** | (2014.01) |
| ***C09D 11/102*** | (2014.01) |
| ***C09D 11/322*** | (2014.01) |

(52) U.S. Cl.
CPC .......... *C09D 11/037* (2013.01); *C09D 11/102* (2013.01); *C09D 11/322* (2013.01)

(56) References Cited

U.S. PATENT DOCUMENTS

| | | | |
|---|---|---|---|
| 2012/0306977 | A1 | 12/2012 | Komatsu |
| 2013/0115431 | A1 | 5/2013 | Aoyama et al. |
| 2013/0149505 | A1 | 6/2013 | Yano et al. |
| 2014/0022321 | A1 | 1/2014 | Komatsu |
| 2020/0376854 | A1 | 12/2020 | Morita et al. |

FOREIGN PATENT DOCUMENTS

| | | | |
|---|---|---|---|
| JP | 2004231711 | A | 8/2004 |
| JP | 2008524400 | A | 7/2008 |
| JP | 2008246821 | A | 10/2008 |
| JP | 2009515007 | A | 4/2009 |
| JP | 2011515535 | A | 5/2011 |
| JP | 2013144730 | A | 7/2013 |
| JP | 2017019972 | A | 1/2017 |
| JP | 2019178205 | A | 10/2019 |
| JP | 6934554 | B1 | 9/2021 |
| JP | 2024050444 | A | 4/2024 |
| WO | WO-97048769 | A1 | 12/1997 |
| WO | WO-2006066132 | A2 | 6/2006 |
| WO | WO-2007053564 | A2 | 5/2007 |
| WO | WO-2009117071 | A1 | 9/2009 |
| WO | WO-2025126617 | A1 | 6/2025 |

Case of hydrophilic penetrating agent (14)

Case of hydrophobic penetrating agent (15)

WATER-BASED INK FOR INKJET RECORDING, PRINTED RECORDING MEDIUM, INKJET RECORDING METHOD, INKJET RECORDING DEVICE, AND INK STORAGE CONTAINER

CROSS-REFERENCE TO RELATED APPLICATIONS

The present claims priority to Japanese Patent Application No. 2021-195237, filed Dec. 1, 2021, the entire disclosure of which is incorporated herein by reference.

BACKGROUND OF THE DISCLOSURE

Technical Field

The present disclosure relates to a water-based ink for inkjet recording, a printed recording medium, an inkjet recording method, an inkjet recording device, and an ink storage container.

Background Art

Known methods to improve fixing performance of water-based inks include increasing the affinity between a water-based ink and a recording medium to improve penetration. However, the methods have a problem with low optical density (OD value) recording because the water-based ink penetrates deeply into the recording medium, not only on the surface but also in a depth direction. Therefore, to improve the optical density (OD value) of materials recorded with water-based ink, a method including increasing colorant concentration is known.

SUMMARY OF THE DISCLOSURE

According to an aspect of the present disclosure, a water-based ink for inkjet recording includes a pigment, water, a penetrating agent, and a binder resin. The penetrating agent includes a compound of formula (1):

$$C_xH_{2x+1}-O-(CH_2CH_2O)_2-H \quad (1)$$

wherein x is greater than or equal to 6. The binder resin comprises a urethane bond. A content of the binder resin in the water-based ink is greater than 1.0 mass %.

According to another aspect of the present disclosure, a printed recording medium includes: a substrate; and the above-described water-based ink printed on the substrate.

According to a further aspect of the present disclosure, an inkjet recording method includes ejecting the above-described water-based ink onto a recording medium.

According to a further aspect of the present disclosure, an inkjet recording device includes: the above-described water-based ink; an ink storing unit storing the water-based ink; and an ink ejecting unit to eject the water-based ink to a recording medium.

According to a further aspect of the present disclosure, an ink storage container includes the above-described water-based ink stored therein.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
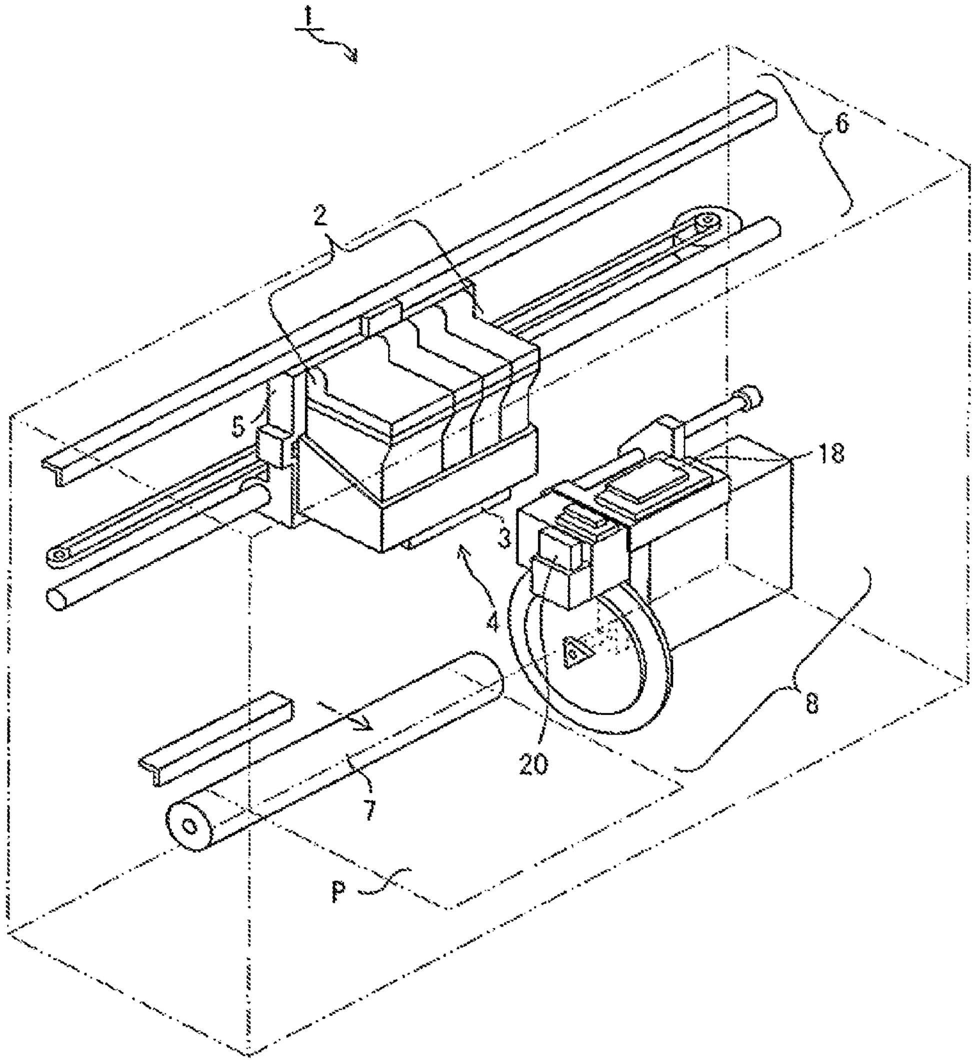
FIG. 1 is a schematic perspective view of an exemplary inkjet recording device according to the present disclosure.

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

Higher concentrations of colorants may cause an increase in cost and reduction in stability of water-based inks.

Exemplary embodiments of water-based inks for inkjet recording according to the present disclosure (hereinafter referred to as "water-based ink" or "ink") are described below. The water-based ink contains pigment, water, a penetrating agent, and a binder resin. By including pigment, water, a specific penetrating agent, and a specific binder resin, the water-based ink for inkjet recording can improve the optical density (OD value) of recorded materials without increasing the colorant concentration.

The pigment is not particularly limited, and includes, for example, carbon black, inorganic pigments, organic pigments, and the like. Examples of carbon black include furnace black, lamp black, acetylene black, channel black, and the like. Examples of inorganic pigments include titanium dioxide, iron oxide inorganic pigments, carbon black inorganic pigments, and the like. Examples of organic pigments include azo pigments such as azo lakes, insoluble azo pigments, condensed azo pigments, and chelated azo pigments; polycyclic pigments such as phthalocyanine pigments, perylene and perinone pigments, anthraquinone pigments, quinacridone pigments, dioxazine pigments, thioindigo pigments, isoindolinone pigments, and quinophthalone pigments; dye lake pigments such as basic dye-type lake pigments and acid dye-type lake pigments; nitro pigments such as nitroso pigments; aniline black daylight fluorescent pigments; and the like. Other pigments can also be used if they can be dispersed in a water-based phase. Specific examples of these pigments include C.I. Pigment Black 1, 6, and 7; C.I. Pigment Yellow 1, 2, 3, 12, 13, 14, 15, 16, 17, 55, 74, 78, 150, 151, 154, 180, 185 and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C.I. Pigment violet 19 and 196; C.I. Pigment Blue 1, 2, 3, 15, 15:1, 15:2, 15:3, 15:4, 16, 22, and 60; C.I. Pigment Green 7 and 36; solid solutions of these pigments; and the like. The water-based ink may be produced by dispersing the pigments in water using a dispersing agent. For example, common polymer dispersing agents (resins for pigment dispersion, resin dispersing agents) and the like may be used as the dispersing agent, or they may be prepared in-house. The pigments in the water-based ink may be encapsulated by polymers.

Pigments may be dispersed using, for example, a dispersing device. Dispersing devices used for dispersion of the pigments are not limited so long as they are general dispersion machines, such as ball mills, roll mills, sand mills (for example, high-speed type), and the like.

The pigment may be a self-dispersing pigment. Self-dispersing pigments include those that can be dispersed in water without the use of a dispersing agent, for example, by introducing at least one hydrophilic functional group such as a carbonyl group, hydroxyl group, carboxylic group, sulfonate group, phosphate group, or the like, or salts thereof, directly or via other groups into the pigment particles by chemical bonds. Self-dispersing pigments can be those where a pigment is treated by the methods described in Japanese Unexamined Patent Application Publication No. H8-3498, Japanese PCT Unexamined Patent Application Publication No. 2000-513396, Japanese PCT Unexamined Patent Application Publication No. 2008-524400, Japanese PCT Unexamined Patent Application Publication No. 2009-515007, Japanese PCT Unexamined Patent Application Publication No. 2011-515535, and the like. The contents of these documents are incorporated herein by reference in their entireties. Both inorganic and organic pigments can be used as raw materials for the self-dispersing pigments. Pigments suitable for the above treatment include, for example, carbon blacks such as MA8 and MA100, manufactured by Mitsubishi Chemical Corporation. The self-dispersing pigments described above may be commercially available, for example. The above commercial products include, for example, CAB-O-JET (registered trademark) 200, CAB-O-JET (registered trademark) 250C, CAB-O-JET (registered trademark) 260M, CAB-O-JET (registered trademark) 270Y, CAB-O-JET (registered trademark) 300, CAB-O-JET (registered trademark) 400, CAB-O-JET (registered trademark) 450C, CAB-O-JET (registered trademark) 465M, CAB-O-JET (registered trademark) 470Y, manufactured by Cabot Corporation; BONJET (registered trademark) BLACK CW-2 and BONJET (registered trademark) BLACK CW-3, manufactured by Orient Chemical Industries Co., LIOJET (registered trademark) WD BLACK 002C, manufactured by Toyo Ink Co., and the like.

One of the pigments may be used alone or in a combination of two or more pigments. Solid content of the pigment based on a total mass of water-based ink (pigment solid content) is not particularly limited and can be suitably determined. The pigment solid content is, for example, 0.1% to 20 mass %, 1% to 10 mass %, or 2% to 8 mass %. The pigment solid content is the mass of pigment only and does not include the mass of resin dispersants, or the like (in other words, converted to the amount of active ingredients).

The water may be ion exchanged water, pure water, or the like. The amount of water to be blended relative to the total mass of the water-based ink (water ratio) is determined in accordance with desired ink characteristics and the like. The water ratio may, for example, be the remainder after the other ingredients. The amount of water is, for example, 50 to 95 mass %, 55 to 90 mass %, or 60 to 80 mass %.

As described above, the water-based ink further contains a penetrating agent and a binder resin.

The penetrating agent contains a compound expressed by the following formula (1).

$$C_xH_{2x+1}-O-\left(CH_2CH_2O\right)_2-H \qquad (1)$$

In the above formula (1), x may be 6 or greater, for example 6 to 20, 6 to 14, or 6 to 8. Furthermore, $C_xH_{2x+1}$ can be linear or branched.

Examples of compounds expressed by the above formula (1) include diethylene glycol monohexyl ether (DEHE; x=6, linear), diethylene glycol mono-2-ethylhexyl ether (EHDG; x=8, branched), and the like. From the viewpoint of ease of handling, DEHE is preferred as the compound expressed by formula (1), but is not limited thereto. The compound expressed by formula (1) has a standard boiling point of 250° C. or higher, so it is less likely to volatilize into the atmosphere at ambient temperature and pressure, thereby reducing the generation of VOCs (volatile organic compounds). The compounds expressed by formula (1) may, for example, be commercially available. One type of penetrating agent may be used alone or in a combination of two or more types.

The amount of the compound expressed by formula (1) relative to the total mass of water-based ink may be, for example, 0.1% to 20 mass %, 2% to 13 mass %, or 6% to 10 mass %.

The water-based ink may further contain other penetrating agents (penetrating agents other than the compound expressed by formula (1)) to the extent that the effect described herein is not impaired. Other penetrating agents are not limited, and can be, for example, penetrating agents with a standard boiling point of 250° C. or higher, or, as described below, penetrating agents with a standard boiling point of 250° C. or lower. The other penetrating agents include, for example, alkylene diols, glycol ether compounds, and the like. Examples of the alkylene diols include 1,2-hexanediol, 1,2-heptanediol, 1,3-propanediol, 1,2-butanediol, 1,3-butanediol, 1,4-butanediol, 2,3-butanediol, 3-methyl-1,3-butanediol, 1,2-pentanediol, 1,5-pentanediol, 1,6-hexanediol, 2-methyl-2,4-pentanediol 1,4-pentanediol, 1,5-pentanediol, 1,6-hexanediol, 2-methyl-2,4-pentanediol, and 3-methyl-1,5-pentanediol, and the like. Examples of the glycol ether compounds include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n propyl ether, tripropylene glycol-n-butyl ether, and the like.

When the penetrating agent is a combination of two or more penetrating agents including the compound expressed by formula (1), the amount of the penetrating agent relative to the total mass of the water-based ink can be selected in accordance with the purpose. The amount of the penetrating agent is, for example, 0.1 to 20 mass %, 2 to 13 mass %, or 6 to 10 mass %.

The binder resin is, for example, a resin that fixes solid content (for example, pigments and the like) in the water-based ink to the surface of the recording medium, and enhances fixation. The binder resins are not limited so long as they have urethane bonds in a molecule. The urethane bond may be in a side chain, but is preferably in the main chain. In other words, the binder resin can be considered a urethane resin. In addition to the urethane bond, the binder resin may, for example, have an ether, ester, carbonate, or other bond in a main chain and/or side chain.

The binder resin may be, for example, resin particles in a resin emulsion. The resin emulsion, for example, contains resin fine particles and a dispersing medium (for example, water, or the like), wherein the resin fine particles are not in a dissolved state with respect to the dispersing medium, but are dispersed with a specific particle size.

The glass transition temperature (Tg) of the binder resin is not particularly limited, but is, for example, 24° C. to 90° C., preferably 40° C. to 80° C., and more preferably 60° C. to 80° C.

The average particle size of the binder resin is not particularly limited, but is, for example, 5 nm to 500 nm, preferably 20 nm to 300 nm, and more preferably 20 nm to 100 nm. The average particle size can be measured as the arithmetic mean diameter using, for example, an LB-550 dynamic light scattering particle size analyzer manufactured by HORIBA, Ltd.

For example, a binder resin synthesized by a conventionally known method can be used. Examples of known methods include the prepolymer method, in which an isocyanate-terminated prepolymer is synthesized first by reacting a polyol with excess isocyanate, followed by chain extending; a one-shot method, in which polyol, isocyanate, and a chain elongator are polymerized simultaneously; and a solvent method, in which polyurethane is synthesized in a solvent and then the solvent is removed. Note that these are examples, and the binder resin is not limited to those synthesized by these methods.

The binder resin may be commercially available, for example. Examples of commercially available binder resin include SUPERFLEX (registered trademark) 870 and SUPERFLEX (registered trademark) 830SH manufactured by DKS Co.; TAKELAC (registered trademark) W-5661 and TAKELAC (registered trademark) W-6061 manufactured by Mitsui Chemicals Inc., and the like. One type of binder resin may be used alone, or in a combination of two or more types.

The amount of binder resin with a urethane bond relative to the total mass of water-based ink is not limited, so long as the amount exceeds 1.0 mass %. Specifically, for example, the amount may be 1 to 20 mass %, preferably 2 to 14 mass %, and more preferably 5 to 10 mass %.

The water-based ink may further contain other binder resins (binder resins other than those having urethane bonds) to the extent that the effect of the present disclosure is not impaired. The other binder resins are not limited, and examples include acrylic acid-based resins, maleic ester-based resins, vinyl acetate-based resins, carbonate-based resins, polycarbonate-based resins, styrene-based resins, ethylene-based resins, polyethylene-based resins, propylene-based resins, polypropylene-based resins, polyurethane-based resins, and copolymer resins thereof.

When the binder resin is a combination of two or more types of binder resins including a binder resin with a urethane bond, the amount of the binder resin relative to the total mass of water-based ink can be selected in accordance with the purpose. The amount of the binder resin may be 1 to 20 mass %, preferably 2 to 14 mass %, and more preferably 5 to 10 mass %.

Figure 2A:
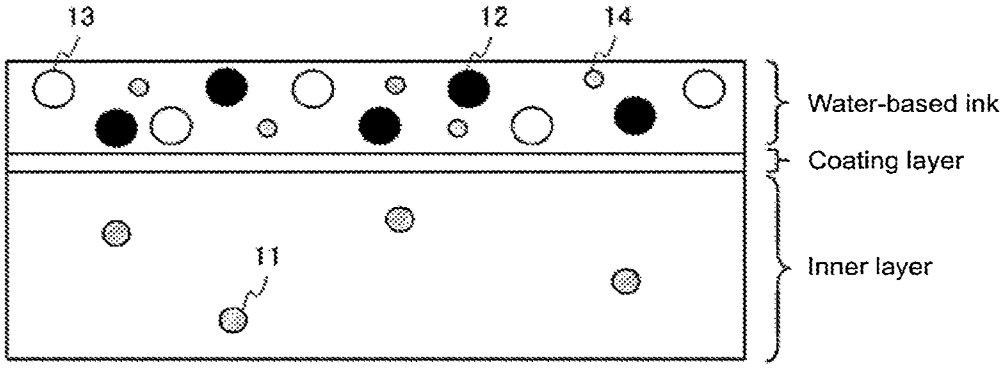
FIGS. 2A and 2B are schematic cross-section views of recording media showing an exemplary mechanism by which water-based ink for inkjet recording according to the present disclosure enhance optical density (OD value) of recorded material.
Figure 2B:
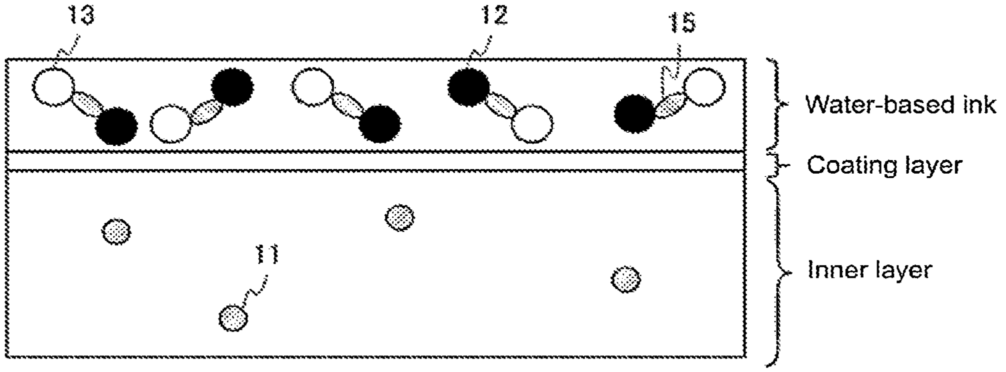

By including a penetrating agent containing a compound expressed by formula (1) and a binder resin having a urethane bond, the optical density (OD value) of the material recorded with water-based ink can be enhanced without increasing the colorant concentration. The mechanism to enhance the optical density (OD value) of materials recorded with water-based ink without increasing the colorant concentration is thought to be as follows. FIGS. 2A and 2B illustrate an example of the mechanism. With a recording medium with a layered structure (for example, coated paper with a coating layer as illustrated in FIGS. 2A and 2B), non-polar or non-water soluble low molecular weight components are more likely to penetrate the inner layer of the recording medium (plain paper). Therefore, as illustrated in FIGS. 2(A) and 2(B), after the water-based ink lands on the coated paper, the low molecular weight organic solvent components (for example, a wetting agent 11 such as triethylene glycol (TEG)) penetrate the plain paper, and other components (for example, penetrating agent, water, glycerin, pigment 12, binder resin 13, and the like) remain on the surface of the recording medium (for example, on the coating layer). Herein, if the penetrating agent that remains on the surface of the recording medium has hydrophilic properties (for example, if the penetrating agent is butyltriglycol (BTG) 14), each component that remains on the surface of the recording medium exists in a dispersed state because of the high affinity to water, as illustrated in FIG. 2A. In contrast, compounds 15 expressed by formula (1), particularly DEHE and EHDG, have high penetration performance among ethylene glycol-based penetrating agents because the number of carbon atoms in the alkyl group is 6 or 8, which provides a hydrophobic structure. Therefore, the compound 15 (DEHE or EHDG) expressed by formula (1) has low affinity to water, and thus exists in an aggregated state with the remaining pigment 12 and binder resin 13 on the surface of the recording medium, as illustrated in FIG. 2B. Furthermore, the compound 15 (DEHE or EHDG) expressed by formula (1) connects the pigment 12 and the binder resin 13, which increases the apparent size, making it easier for the pigment 12 to remain on the surface of the recording medium, increasing the optical density (OD value). The binder resin with a urethane bond promotes film formation of the water-based ink on the surface of the recording medium, resulting in a higher optical density (OD value). However, this mechanism is only a hypothesis, and the present disclosure is not limited thereto.

If the amount of DEHE is 2 mass % or more and 3 mass % or less, the amount of binder resin with a urethane bond may be increased to 3 mass % or more in order to further improve the optical density (OD value). In this case, the upper limit of the amount of the binder resin with a urethane bond is, for example, the same as described above.

The water-based ink may contain organic solvents other than the penetrating agent described above. The organic solvent is, for example, a wetting agent. The wetting agent may be, for example, an organic solvent with an SP value of 12 to 14 (hereinafter referred to as a first wetting agent) or an organic solvent with an SP value other than 12 to 14 (hereinafter referred to as a second wetting agent), but preferably is an organic solvent with an SP value of 12 to 14. The SP (Solubility Parameter) value is obtained by the Fedors method, for example, using the following equation, and is expressed in units of (cal/cm3)1/2.

$$\text{SP value}=(\Sigma\Delta ei/\Sigma\Delta vi)1/2$$

Δei: evaporation energy of atoms and atomic clusters (cal/mol)

Δvi: molar volume (cm3/mol)

Examples of the wetting agent include lower alcohols such as methyl alcohol, ethyl alcohol, n-propyl alcohol, isopropyl alcohol, n-butyl alcohol, sec-butyl alcohol and tert-butyl alcohol, and the like; amides such as dimethylformamide, dimethylacetamide, and the like; ketones such as acetone and the like; keto alcohols such as diacetone alcohols and the like; ethers such as tetrahydrofuran, dioxane, and the like; polyhydric alcohols such as polyalkylene glycol, alkylene glycol, glycerin, and the like; 2-pyrrolidone; N-methyl-2-pyrrolidone; 1,3-dimethyl-2-imidazolidinone, and the like. The polyalkylene glycol is not limited, and examples include polyethylene glycol, polypropylene glycol, and the like. The alkylene glycol is not limited, but examples include ethylene glycol, propylene glycol, butylene glycol, diethylene glycol, triethylene glycol, dipropylene glycol, tripropylene glycol, thiodiglycol, hexylene glycol, and the like. Of these, polyhydric alcohols such as alkylene glycol, glycerin, and the like are suitable. One type of wetting agent may be used alone, or in a combination of two or more types. The wetting agent may be commercially available, for example.

Examples of the first wetting agent include triethylene glycol (TEG; SP value=13.6), tripropylene glycol (TPG; SP value=12.1), polyethylene glycol with an average molecular weight of 190 to 210 (PEG) SP value=12.8), and the like.

The amount of the first wetting agent relative to the total mass of the water-based ink may be, for example, 0.1 mass % to 20 mass %, preferably 1 mass % to 10 mass %, and more preferably 3 mass % to 7 mass %.

The first wetting agent is thought to be capable of enhancing the solubility of the compound expressed by formula (1) (penetrating agent) in the water-based ink. However, the present disclosure is not limited by the aforementioned hypothesis.

If the water-based ink contains the first wetting agent, the amount (A) of the wetting agent, which is the compound expressed by formula (1) serving as the penetrating agent, and the solid content (B) of the pigment (mass %), may satisfy at least one of the following conditions: $0.5 \leq A/B \leq 4.0$ (hereinafter also referred to as Condition (X)) and $1.5 \leq A/B \leq 3.0$ (hereinafter also referred to as Condition (Y)). In this case, the amount (mass %) (A) of the compound expressed by formula (1), which is the penetrating agent, and the amount (mass %) (B) of the solid content of the pigment should be adjusted appropriately to satisfy Condition (X) and/or Condition (Y), but are not particularly limited.

The second wetting agent is, for example, glycerin (SP value=20.0) or the like. The amount of glycerin relative the total mass of water-based ink can be appropriately selected in accordance with the purpose.

If the wetting agent is a combination of two or more wetting agents, including at least the first wetting agent and the second wetting agent, the amount of the wetting agents relative to the total mass of water-based ink can be appropriately selected in accordance with the purpose. The amount of the wetting agent may be 0 to 95 mass %, preferably 1 to 80 mass %, and more preferably 3 to 50 mass %.

The water-based ink may, for example, further contain a surfactant.

The surfactant is not limited and may be selected in accordance with the purpose, and for example, commercially available products may be used. Specifically, the surfactant includes, for example, silicone surfactants, acetylene surfactants, and the like. In particular, the silicone surfactant does not contain impurities such as ethylene oxide or the like, and therefore, if a silicone-based surfactant is used as the surfactant, VOC generation can be further reduced.

Examples of commercially available silicone surfactants include SILFACE (registered trademark) SAG002, SILFACE (registered trademark) SAG005, and SILFACE (registered trademark) SAG503A, and the like, manufactured by Nissin Chemical Industry Co.

Commercial acetylene surfactants include: OLFINE E1004, OLFINE E1008, and OLFINE E1010 manufactured by Nissin Chemical Industry; SURFINOL 440, SURFINOL 465, and SURFINOL 485 manufactured by Air Products and Chemicals, Inc.; ACETYLENOL (registered trademark) E40 and ACETYLENOL (registered trademark) E100 manufactured by Kawaken Fine Chemicals Co., and the like.

The water-based ink may contain other surfactants in addition to or as a substitute for the silicone surfactants and acetylene surfactants. Examples of other surfactants include nonionic surfactants manufactured by Kao Corporation such as EMULGEN (registered trademark) series, RHEODOL (registered trademark) series, EMASOL (registered trademark) series, EXCEL (registered trademark) series, EMANON (registered trademark) series, AMIET (registered trademark) series, AMINON (registered trademark) series, and the like; nonionic surfactants manufactured by TOHO CHEMICAL INDUSTRIES such as the SOLVON (registered trademark) series; nonionic surfactants manufactured by LION CORPORATION such as the DOBANOX (registered trademark) series, the LEOCOL (registered trademark) series, the LEOX (registered trademark) series, the LAOL, LEOCOL (registered trademark) series, the LIONOL (registered trademark) series, the CADENAX (registered trademark) series, LIONON (registered trademark) series, LEOFAT (registered trademark) series, and the like; anionic surfactants manufactured by KAO CORPORATION such as the EMAL (registered trademark) series, LATEMUL (registered trademark) series, VENOL (registered trademark) series, NEOPELEX (registered trademark) series, and NS SOAP, KS SOAP, OS SOAP, and PELEX (registered trademark) series, and the like; anionic surfactants manufactured by LION CORPORATION such as LIPOLAN (registered trademark) series, LIPON (registered trademark) series, SUNNOL (registered trademark) series, LIPOTAC (registered trademark) series, TE, ENAGICOL series, the LIPAL (registered trademark) series, and the LOTAT series, and the like; cationic surfactants manufactured by DKS Co. such as "Catiogen (registered trademark) ES-OW and "Catiogen (registered trademark) ES-L, and the like.

One type of surfactant may be used alone, or in a combination of two or more types.

The amount of surfactant relative to the total mass of water-based ink can be appropriately selected in accordance with the purpose. The amount of the surfactant may be 0.1 to 5 mass %, preferably 1 to 3.5 mass %, and more preferably 1.5 to 3 mass %. Note that the amount of surfactant herein is the sum of the amounts of two or more surfactants.

The water-based ink may also contain conventionally known additives as needed. The additives include, for example, pH adjusting agents, viscosity adjusting agents, surface tension adjusting agents, anti-mold agents, and the like. Examples of the viscosity adjusting agent include polyvinyl alcohol, cellulose, water-soluble resins, and the like.

In embodiments, the water-based ink may be a water-based ink for recording media with a layered structure. An example of the layered structure is a structure with at least two layers that absorb water-based ink at different rates. At least one of the layered structures may be formed, for example, by application of a specific paint. The recording medium with a layered structure described above is not particularly limited, and includes, for example, coated paper, glossy paper, and the like. "Coated paper" refers to plain paper containing mainly pulp, such as high-grade printing paper and intermediate-grade printing paper, coated with a coating agent to improve smoothness, whiteness, gloss, and the like. Specific examples include high-grade coated paper, intermediate-grade coated paper, and the like. "Glossy paper" refers to recording media that contains, for example, an image forming layer that produces a glossy texture, an ink absorbing layer that absorbs ink well, a white ground adjustment layer that forms a strong white color, and base paper with adjusted thickness.

In embodiments, an ink storage container according to the present disclosure is an ink container that contains a water-based ink for inkjet recording, and the water-based ink is the water-based ink for inkjet recording according to the present disclosure. Examples of the ink storage container include ink cartridges, tanks, pouches, and the like. The main body of the ink storage container may be a conventionally known container main body, for example.

Next, inkjet recording devices and inkjet recording methods will be described.

In embodiments, the inkjet recording device of the present disclosure is an inkjet recording device that includes an ink storing part and ink ejecting means, and the ink contained in the ink storing part is ejected by the ink ejecting means. The water-based ink for inkjet recording of the present disclosure is stored in the ink storing part.

FIG. 1 illustrates an exemplary configuration of an inkjet recording device of the present disclosure. As illustrated in the drawing, an inkjet recording device 1 includes four ink storing parts (ink cartridge 2), ink ejecting means (inkjet head) 3, a head unit 4, a carriage 5, a drive unit 6, a platen roller 7, and a purging device 8 as major components.

The four ink cartridges 2 contain four colors of water-based ink, one each of yellow, magenta, cyan, and black. For example, at least one of the four water-based inks is the water-based ink of the present disclosure. This example shows a set of four ink cartridges 2, but instead, an integrated ink cartridge may be used, having the interior partitioned to form a water-based yellow ink compartment, a water-based magenta ink compartment, a water-based cyan ink compartment, and a water-based black ink compartment. The body of the ink cartridge may be a conventionally known cartridge, for example.

The inkjet head 3 installed in the head unit 4 records on a recording medium (for example, recording paper) P. The four ink cartridges 2 and the head unit 4 are mounted on the carriage 5. The drive unit 6 moves the carriage 5 back and forth in a straight line direction. The drive unit 6 may be any conventionally known drive unit, for example (see, for example, Japanese Unexamined Patent Application Publication No. 2008-246821, the contents of which are incorporated herein by reference in their entireties). The platen roller 7 extends in a reciprocating direction of carriage 5 and is disposed opposite the inkjet head 3.

The purging device 8 suctions out defective ink containing air bubbles and the like that accumulate inside the inkjet head 3. For example, a conventionally known purging device can be used as the purging device 8 (see, for example, Japanese Unexamined Patent Application Publication No. 2008-246821).

A wiper member 20 is provided on the platen roller 7 side of the purging device 8, adjacent to the purging device 8. The wiper member 20 is formed in the shape of a spatula, and wipes a nozzle forming surface of the inkjet head 3 as the carriage 5 moves. In FIG. 1, a cap 18 covers a plurality of nozzles of the inkjet head 3 when the head has returned to the reset position after recording is finished, in order to prevent the water-based ink from drying out.

In the inkjet recording device 1 of FIG. 1, the four ink cartridges 2 are mounted on one carriage 5 together with the head unit 4. However, the present disclosure is not limited thereto. In the inkjet recording device 1, each of the four ink cartridges 2 may be mounted on a carriage separate from the head unit 4. Each of the four ink cartridges 2 may be provided and secured in the inkjet recording device 1, rather than being mounted on the carriage 5. In these aspects, for example, each of the four ink cartridges 2 and the head unit 4 mounted on the carriage 5 are connected by tubing or the like, and the water-based ink is supplied from each of the four ink cartridges 2 to the head unit 4. Furthermore, in these aspects, four ink bottles in bottle form may be used instead of the four ink cartridges 2. In this case, it is preferable that the ink bottle has an injection port for injection ink from the outside into the inside.

Inkjet recording using this inkjet recording device 1 is performed, for example, as follows. First, the recording paper P is fed from a paper feeding cassette (not shown) provided on the side or below the inkjet recording device 1. The recording paper P is introduced between the inkjet head 3 and the platen roller 7. Predetermined recording is performed on the introduced recording paper P by the water-based ink ejected from the inkjet head 3. The ejecting may be performed, for example, at a first ejecting volume, as described above, or at a second ejecting volume, if certain conditions are met. After recording, the recording paper P is ejected from the inkjet recording device 1. In FIG. 1, paper feeding and paper ejecting mechanisms for the recording paper P are omitted.

The device illustrated in FIG. 1 uses a serial inkjet head, but the present disclosure is not limited thereto. The inkjet recording device may be a line inkjet head or a roller-to-roller device.

In embodiments, the inkjet recording method of the present disclosure is an inkjet recording method that includes a recording step in which water-based ink is ejected onto a recording medium by an inkjet method, and in the recording step, the water-based ink for inkjet recording of the present disclosure is used as the water-based ink. The inkjet recording method can be performed, for example, using the inkjet recording device of the present disclosure. The recording includes printing, text printing, image printing, and the like.

EXAMPLES

Examples according to the present disclosure, together with comparative examples, are described below. The invention(s) described herein are not intended to be limited or restricted by the examples and comparative examples.

[Preparation of Pigment Dispersion Liquid A]

Pure water was added to a mixture of a pigment (C.I. Pigment blue 15:3) and of sodium hydroxide-neutralized product of a styrene-acrylic acid copolymer (acid value of 50 mg KOH/g, molecular weight of 10,000) and stirred to obtain a further mixture including 20 mass % of the pigment and 7 mass % of the styrene-acrylic acid copolymer based a total of 100 mass %. The resulting mixture was placed in a wet sand mill filled with 0.3 mm diameter zirconia beads and dispersed for 6 hours. Afterwards, the zirconia beads were removed by a separator and filtered through a 3.0 μm pore diameter cellulose acetate filter to obtain Pigment Dispersion Liquid A. The styrene-acrylic acid copolymer was a water-soluble polymer generally used as a pigment dispersing agent.

[Binder Resin A]

Binder Resin A was synthesized by reacting a glycol with a polyisocyanate. In the synthesis, the acid value of Binder Resin A was controlled by adjusting the ratio of each component and its functional groups, such as carboxy and amino groups or the like. The acid value of Binder Resin A, measured in accordance with JIS K2501, was 48 mg KOH/g.

Examples 1 to 11 and Comparative Examples 1 to 5

Components of each water-based ink composition shown in Table 1 below, except for the pigment dispersion liquid, were uniformly mixed to obtain an ink solvent. Next, the ink solvent was added to the pigment dispersion liquid and mixed uniformly. The resulting mixture was then filtered through a cellulose acetate-type membrane filter (pore diameter 3.00 μm) manufactured by Toyo Filter Paper Co. to obtain the water-based inks for inkjet recording of Examples 1 to 11 and Comparative Examples 1 to 5.

Optical density (OD value) evaluation of the water-based inks of Examples 1 to 12 and Comparative Examples 1 to 5 was performed by the following method.

(Optical Density (OD Value) Evaluation)

Evaluation samples for each the water-based inks of the examples and comparative examples were prepared by recording images on coated paper (N Miller73 P22 G7B manufactured by Oji Tack Co., Ltd.) using a DCP-J4225N digital multifunction inkjet printer manufactured by Brother Industries, Ltd., and the respective water-based inks. The optical density (OD value) at three locations on each evaluation sample was measured with an X-Rite spectrophotometer Spectro Eye (light source: D50, viewing angle: 2°, ANSI-T), manufactured by X-Rite. The average value was calculated and an evaluation was made based on the following evaluation criteria.

—Optical Density (OD Value) Evaluation Criteria—

AA: Optical density (OD value) exceeds 2.4

A: Optical density (OD value) is 1.90 or higher and 2.39 or lower

B: Optical density (OD value) is 1.65 or higher and 1.89 or lower

C: Optical density (OD value) is less than 1.65

The compositions and evaluation results for the water-based inks of Examples 1 to 12 and Comparative Examples 1 to 5 are shown in Table 1.

TABLE 1

| | | | Examples | | | | | | | | |
|---|---|---|---|---|---|---|---|---|---|---|---|
| | | | 1 | 2 | 3 | 4 | 5 | 6 | 7 | 8 | 9 |
| Water-based ink composition (mass %) | Colorant (B) | Pigment Dispersion Liquid A (*1) | 3.5 | 3.5 | 3.5 | 3.5 | 3.5 | 3.5 | 3.5 | 3.5 | 3.5 |
| | Penetrating agent (A) | Diethylene glycol monohexyl ether | 2.0 | 2.0 | 2.0 | 2.0 | — | 2.0 | 6.0 | 2.0 | 1.5 |
| | | Diethylene glycol mono-2-ethylhexyl ether | — | — | — | — | 2.0 | — | — | — | — |
| | | Butyltriglycol | — | — | — | — | — | — | — | — | — |
| | Binder resin | Binder resin A (*2) | 5.0 | — | 5.0 | 5.0 | 5.0 | 5.0 | 1.1 | 10.0 | 5.0 |
| | | Superflex (Registered trademark) 870 (*3) | — | 5.0 | — | — | — | — | — | — | — |
| | | Mowinyl (Registered trademark) 6969D (*4) | — | — | — | — | — | — | — | — | — |
| | Wetting agent | Glycerin (86%) | 19.0 | 19.0 | 19.0 | 19.0 | 19.0 | 19.0 | 19.0 | 19.0 | 19.0 |
| | | Triethylene glycol | 5.0 | 5.0 | 5.0 | 5.0 | 5.0 | — | 5.0 | 5.0 | 5.0 |
| | | Diethylene glycol | — | — | — | — | — | 5.0 | — | — | — |
| | Surfactant | SUNNOL (Registered trademark) NL-1430 (*5) | 1.0 | 1.0 | 1.0 | 1.0 | 1.0 | 1.0 | 1.0 | 1.0 | 1.0 |

TABLE 1-continued

| | | | | | | | | | | |
|---|---|---|---|---|---|---|---|---|---|---|
| | OLFINE (Registered trademark) E1010 (*6) | — | — | 2.0 | — | — | — | — | — | — |
| | Silface (Registered trademark) SAG503A (*7) | — | — | — | 1.0 | — | — | — | — | — |
| pH adjusting agent | Triethanolamine | 0.2 | 0.2 | 0.2 | 0.2 | 0.2 | 0.2 | 0.2 | 0.2 | 0.2 |
| Water | | Remainder | Remainder | Remainder | Remainder | Remainder | Remainder | Remainder | Remainder | Remainder |
| A/B | | 0.6 | 0.6 | 0.6 | 0.6 | 0.6 | 0.6 | 1.7 | 0.6 | 0.4 |
| Optical density (OD value) | | A | A | A | A | A | B | A | AA | B |

| | | | Examples | | | Comparative Examples | | | | |
|---|---|---|---|---|---|---|---|---|---|---|
| | | | 10 | 11 | 12 | 1 | 2 | 3 | 4 | 5 |
| Water-based ink composition (mass %) | Colorant (B) | Pigment Dispersion Liquid A (*1) | 3.5 | 3.5 | 3.5 | 3.5 | 3.5 | 3.5 | 3.5 | 3.5 |
| | Penetrating agent (A) | Diethylene glycol monohexyl ether | 6.0 | 10.0 | 13.0 | — | 2.0 | 2.0 | — | 2 |
| | | Diethylene glycol mono-2-ethylhexyl ether | — | — | — | — | — | — | — | — |
| | | Butyltriglycol | — | — | — | — | — | — | 2.0 | — |
| | Binder resin | Binder resin A (*2) | 5.0 | 5.0 | 5.0 | 5.0 | 0.5 | — | 5.0 | — |
| | | Superflex (Registered trademark) 870 (*3) | — | — | — | — | — | — | — | — |
| | | Mowinyl (Registered trademark) 6969D (*4) | — | — | — | — | — | — | — | 5.0 |
| | Wetting agent | Glycerin (86%) | 19.0 | 19.0 | 19.0 | 19.0 | 19.0 | 19.0 | 19.0 | 19.0 |
| | | Triethylene glycol | 5.0 | 5.0 | 5.0 | 5.0 | 5.0 | 5.0 | 5.0 | 5.0 |
| | | Diethylene glycol | — | — | — | — | — | — | — | — |
| | Surfactant | SUNNOL (Registered trademark) NL-1430 (*5) | 1.0 | 1.0 | 1.0 | 1.0 | 1.0 | 1.0 | 1.0 | 1.0 |
| | | OLFINE (Registered trademark) E1010 (*6) | — | — | — | 2.0 | — | — | — | — |
| | | Silface (Registered trademark) SAG503A (*7) | — | — | — | — | — | — | — | — |
| | pH adjusting agent | Triethanolamine | 0.2 | 0.2 | 0.2 | 0.2 | 0.2 | 0.2 | 0.2 | 0.2 |
| | Water | | Remainder | Remainder | Remainder | Remainder | Remainder | Remainder | Remainder | Remainder |
| A/B | | | 1.7 | 2.9 | 3.7 | 0.0 | 0.6 | 0.6 | 0.6 | 0.6 |
| Optical density (OD value) | | | AA | AA | A | C | C | C | C | C |

(*1): Water dispersion of C.I. Pigment Blue 15:3 (containing resin dispersing agent): Numbers in the table indicate pigment solid content.
(*2): Urethane resins: Numbers in the table indicate blended amounts.
(*3): Urethane resins: Numbers in the table indicate blended amounts.
(*4): Acrylic resins: Numbers in the table indicate blended amounts.
(*5): Anionic surfactant: Lion Corporation: Numbers in the table indicate blended amounts.
(*6): Acetylene glycol surfactant: Nissin Chemical Industry Co.: Numbers in the table indicate blended amounts.
(*7): Silicone-based surfactant: Nissin Chemical Industry Co.: Numbers in the table indicate blended amounts.

As shown in Table 1, the evaluation results for optical density (OD value) were favorable, with a score of "B" or better, for Examples 1 to 12. Example 1, which included the first wetting agent, had more favorable optical density (OD value) evaluation results than Example 6, which had the same composition except for the inclusion of the second wetting agent. Example 1, which satisfied Condition X ($0.5 \leq A/B \leq 4.0$) and contained the first wetting agent, had more favorable optical density (OD value) evaluation results than Example 9, which had the same composition except that Condition X was not satisfied. Examples 10 and 11, which satisfied Condition Y ($1.5 \leq A/B \leq 3.0$), had more favorable optical density (OD value) evaluation results than Example 1, which had the same composition except that Condition Y was not satisfied.

Comparative Example 1, which did not include the compound according to formula (1), yielded evaluation results for optical density (OD value) that were inferior. Comparative Example 2, in which the amount of the binder resin was less than 1.0 mass %, yielded evaluation results for optical density (OD value) that were inferior. Comparative Example 3, in which the binder resin was not used, yielded evaluation results for optical density (OD value) that were inferior. Comparative Example 4, which contained a compound according to formula (1) in which x=4, yielded evaluation results for optical density (OD value) that were inferior. Comparative Example 5, in which an acrylic resin was used instead of the binder resin with urethane bonds (urethane resin), yielded evaluation results of optical density (OD value) that were inferior.

As shown above, water-based inks according to the present disclosure can improve the optical density (OD value) of materials recorded with water-based ink, without increasing the colorant concentration. The water-based inks of the present disclosure are widely applicable to inkjet recording on various recording media.

Obviously, numerous modifications and variations of the present invention(s) are possible in light of the above teachings. It is therefore to be understood that within the scope of the appended claims, the invention(s) may be practiced otherwise than as specifically described herein.

The invention claimed is:

1. A water-based ink, comprising:
a pigment;
water;
a penetrating agent;
a binder resin; and
an organic solvent having a solubility parameter (SP) value of 12 to 14,
wherein:
the penetrating agent comprises a compound of formula (1):

$$C_xH_{2x+1}-O-(CH_2CH_2O)_2-H \quad (1)$$

wherein x is greater than or equal to 6;
the binder resin comprises a urethane bond;
a content of the binder resin in the water-based ink is greater than 1.0 mass %;
a content of the compound of formula (1) in the water-based ink and a solid content of the pigment in the water-based ink satisfy Condition (X):

$$0.5 \leq A/B \leq 4.0 \quad \text{Condition (X):}$$

wherein A is the content of the compound of formula (1) by mass %, and B is the solid content of the pigment by mass %; and
a glass transition temperature of the binder resin is in a range from 24 to 90° C.

2. The water-based ink according to claim 1, wherein the compound of formula (1) is diethylene glycol monohexyl ether.

3. The water-based ink according to claim 1, wherein the organic solvent comprises triethylene glycol.

4. The water-based ink according to claim 1, wherein the content of the compound of formula (1) in the water-based ink and the solid content of the pigment satisfy Condition (Y):

$$1.5 \leq A/B \leq 3.0 \quad \text{Condition (Y):}$$

wherein A and B are each as defined in Condition (X).

5. The water-based ink according to claim 1, wherein the content of the binder resin in the water-based ink is 5 to 10 mass %.

6. The water-based ink according to claim 1, wherein the water-based ink has a composition suitable for inkjet recording on a recording medium having a layered structure.

7. The water-based ink according to claim 1, wherein:
the compound of formula (1) is diethylene glycol monohexyl ether and/or diethylene glycol mono-2-ethylhexyl ether.

8. The water-based ink according to claim 1, wherein:
the compound of formula (1) is diethylene glycol monohexyl ether and/or diethylene glycol mono-2-ethylhexyl ether;
the organic solvent comprises triethylene glycol; and
the content of the binder resin in the water-based ink is 1.0 to 10 mass %.

9. The water-based ink according to claim 1, wherein in the formula (1), x is greater than or equal to 8.

10. A printed recording medium, comprising:
a substrate; and
the water-based ink according to claim 1, printed on the substrate.

11. The printed recording medium according to claim 10, wherein the substrate has a layered structure.

12. An inkjet recording method, comprising ejecting the water-based ink according to claim 1 onto a recording medium.

13. The inkjet recording method according to claim 12, wherein the recording medium has a layered structure.

14. An inkjet recording device, comprising:
the water-based ink according to claim 1;
an ink storing unit storing the water-based ink; and
an ink ejecting unit capable of ejecting the water-based ink to a recording medium.

15. An ink storage container, comprising the water-based ink according to claim 1 stored therein.

* * * * *